United States Patent [19]

Hayashi

[11] Patent Number: 5,689,341
[45] Date of Patent: Nov. 18, 1997

[54] LCD PANEL TEST SYSTEM

[75] Inventor: Masaki Hayashi, Hanyu, Japan

[73] Assignee: Advantest Corp., Tokyo, Japan

[21] Appl. No.: 590,594

[22] Filed: Jan. 24, 1996

[30] Foreign Application Priority Data

Jan. 24, 1995 [JP] Japan .................................. 7-027434

[51] Int. Cl.$^6$ .................................................. G01N 21/25
[52] U.S. Cl. ............................................................ 356/418
[58] Field of Search .................... 356/418–419, 356/402–411, 300; 250/226; 359/742, 798

[56] References Cited

U.S. PATENT DOCUMENTS 5,022,740  6/1991  Maziorka ......................... 359/742 X
5,212,536  5/1993  Ball et al. .......................... 356/300

*Primary Examiner*—K. Hantis
*Attorney, Agent, or Firm*—Muramats & Associates

[57] ABSTRACT

A LCD test system is able to adjust the differences in focal point lengths caused by chromatic aberration without increasing the size of the camera system and its manufacturing cost. In addition to the conventional structure, the parallel plates are inserted in the pockets of the rotation plate along with each of the four types of optical filters such as red, green, blue and transparency. Therefore, the differences in the focal point lengths due to the chromatic aberration are adjusted without increasing the size of the camera system and its manufacturing cost drastically.

5 Claims, 3 Drawing Sheets

LCD PANEL TEST SYSTEM

FIELD OF THE INVENTION

This invention relates to an LCD (Liquid Crystal Display) panel test system in which a distance of a focal point for capturing an image of the LCD panel is unchanged even when a color filter is switched.

BACKGROUND OF THE INVENTION

In FIG. 3, a schematic block diagram of the conventional LCD panel test system is shown. The camera system of the conventional LCD panel test system has a camera section 19 having a built-in image element such as CCD (Charge-Coupled Device) for capturing the image contrast data of a display panel 10 to be inspected, a rotation plate 14 having four types of optical filters such as red (R), green (G), blue (B) and transparent for capturing images therethrough; an optical lens 13 having a focal adjustment mechanism for forming an image on the camera section 19; a first motor 15 for rotating the plate 14; and a second motor 20 for moving the optical lens 13 for the focal point adjustment.

When transmitting images through a lens, optical rays are subject to different image formation lengths L depending on the bands of wave length due to chromatic aberration.

More specifically, as shown in FIG. 4(a), a blue ray having the short wavelength has a shorter image formation length L. On the other hand, a red ray having the long wavelength has a longer image length L.

Therefore, as shown in FIG. 4(b), when only a particular color of rays is transmitted by using the color filter, the image formation length L varies on the basis of change in the color.

In the conventional LCD panel test system shown in FIG. 3, when the distance between the optical lens 13 and camera section 19 is fixed, an image becomes out of focus per the colors of the color filters, resulting the lowered efficiency in detecting defects of the LCD panel. Therefore, the position of the optical lens 13 needs to be adjusted by the second motor 20 every time when the color filters are replaced.

However, the conventional structure in which the position of optical lens 13 has to be adjusted by the second motor 20, is disadvantageous because the size and weight of the camera system are increased, as well as its manufacturing cost.

SUMMARY OF THE INVENTION

An objective of the present invention is to provide a LCD panel test system which can correct the difference in the focal point lengths due to the chromatic aberration without increasing the size of the camera system or the manufacturing cost.

In order to achieve the above objective, the LCD panel test system of the present invention includes: a camera section 19 having a built-in image element for capturing the image contrast data of a display panel 10 to be inspected; a rotation plate 14 having four types of optical filters such as red (R), green (G), blue (B) and transparent for capturing images therethrough; an optical lens 13 for forming an image on the camera section 19; a motor 15 for rotating the plate 14; and parallel plates 21 inserted in pockets of the rotation plate 14 with corresponding optical filters.

In the above structured camera system of the present invention, the parallel plates are inserted along with optical filters in the pockets of the rotating plate; thus, the camera system can be compact with little increase of its cost while achieving the objective of the present invention in adjusting the differences in the focal point lengths due to the chromatic aberration.

DETAILED DESCRIPTION OF THE PREFERRED EMBODIMENT

Figure 1:
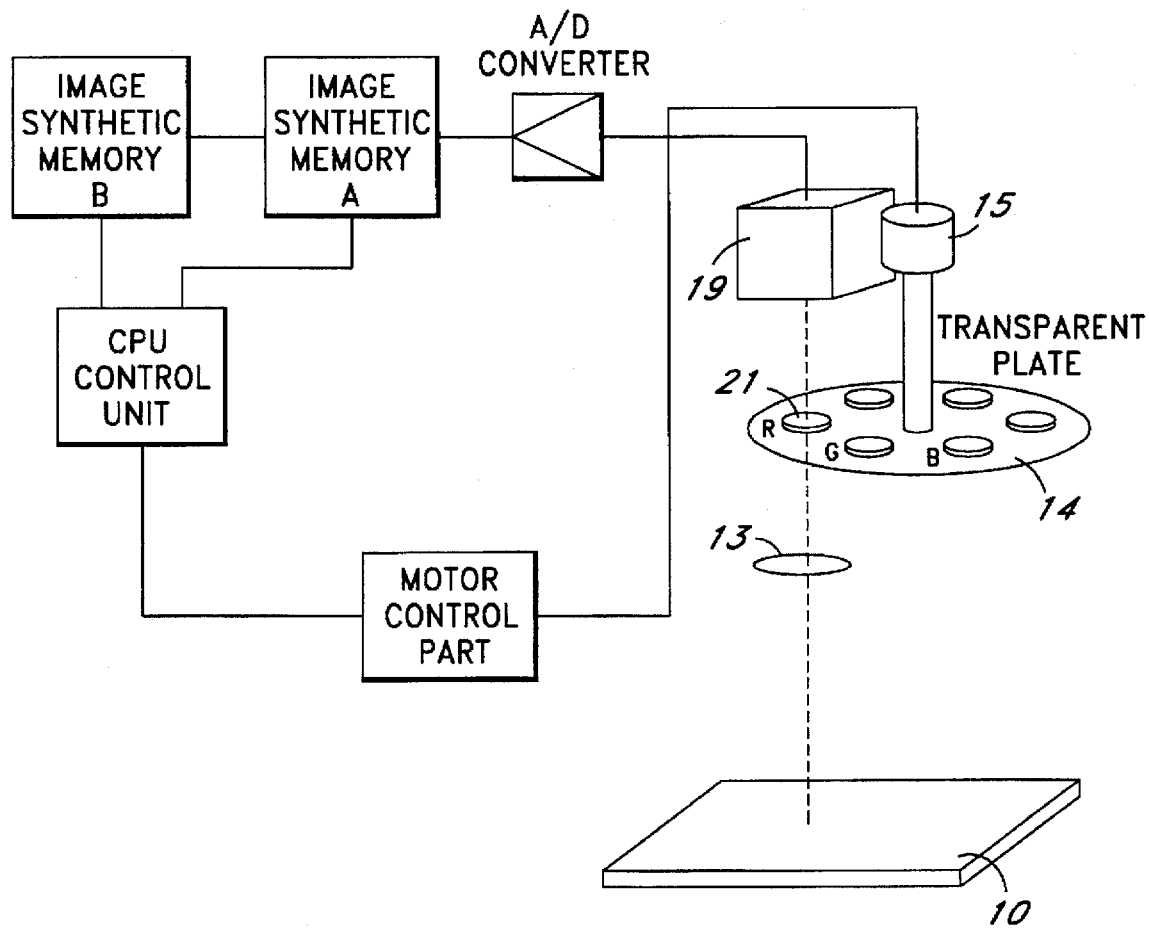
FIG. 1 is a schematic diagram showing the structure of the present invention.

FIG. 1 shows the preferred embodiment of the present invention. As same as in the conventional invention, the camera system for LCD panel test system of the present invention has: the camera section 19 having a built-in image element for capturing the image contrast data of a display panel 10 to be inspected; the rotation plate 14 having four types of optical filters such as red (R), green (G), blue (B) and transparent for capturing images therethrough; the optical lens 13 for forming an image on the camera section 19; the motor 15 for rotating the plate 14. In addition, it is characterized in the present invention to provide parallel plates 21, as adjusting optical glass plates, which are inserted in the pockets of the rotation plate 14 per each of red, green, blue and transparent optical filters to adjust the differences in the focal point lengths due to the chromatic aberration.

Figure 2:
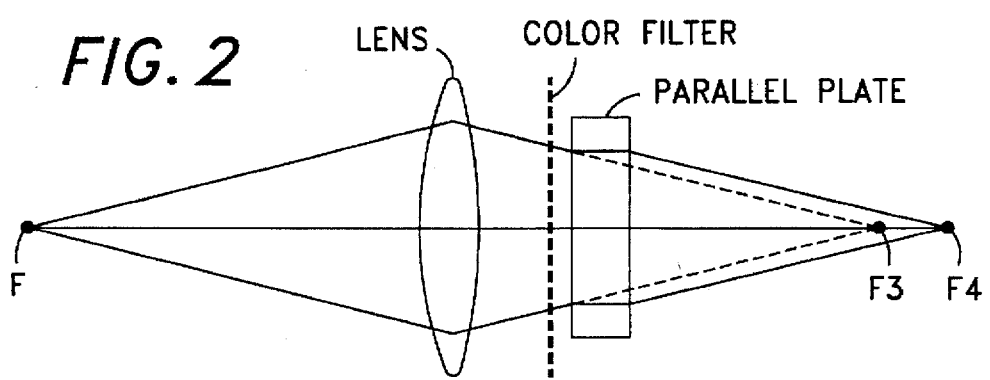
FIG. 2 is a schematic diagram showing the operation of the parallel plates.
Figure 3:
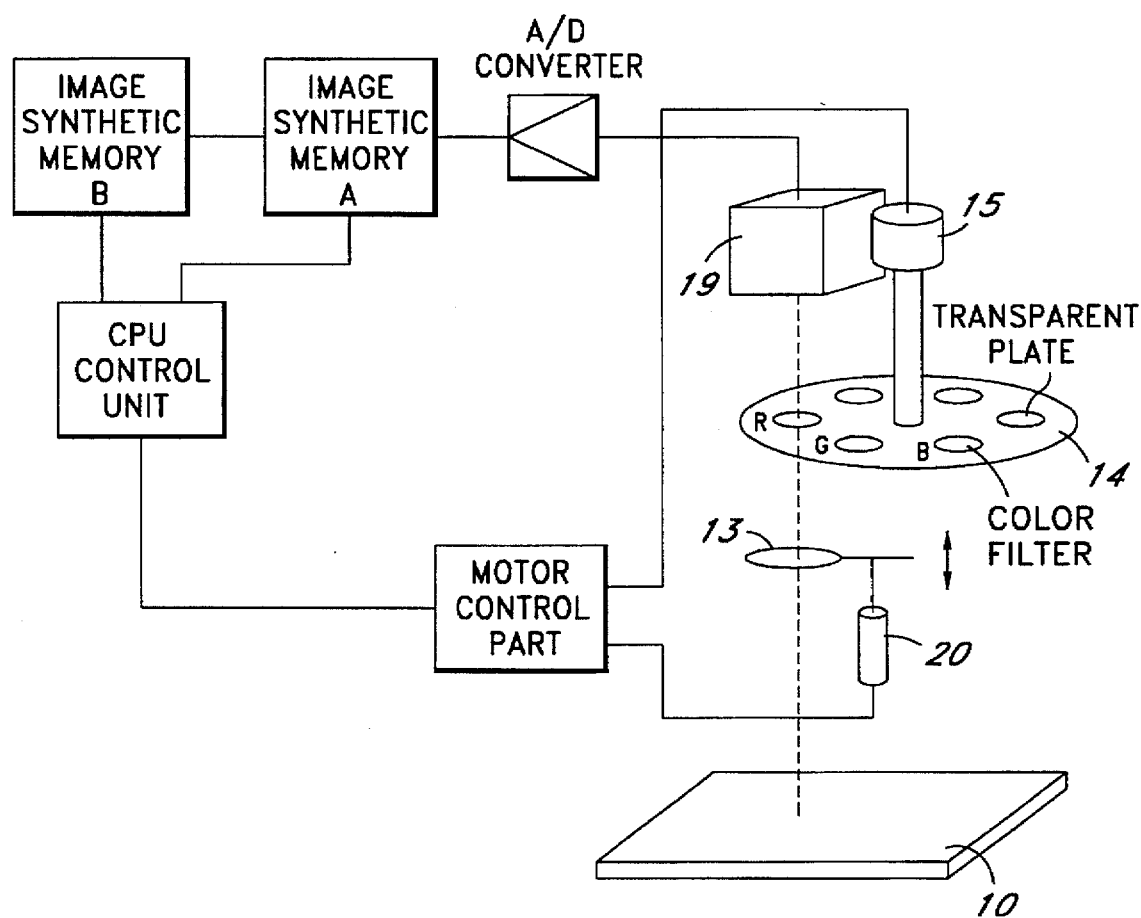
FIG. 3 is a schematic diagram showing the conventional structure.
Figure 4A:
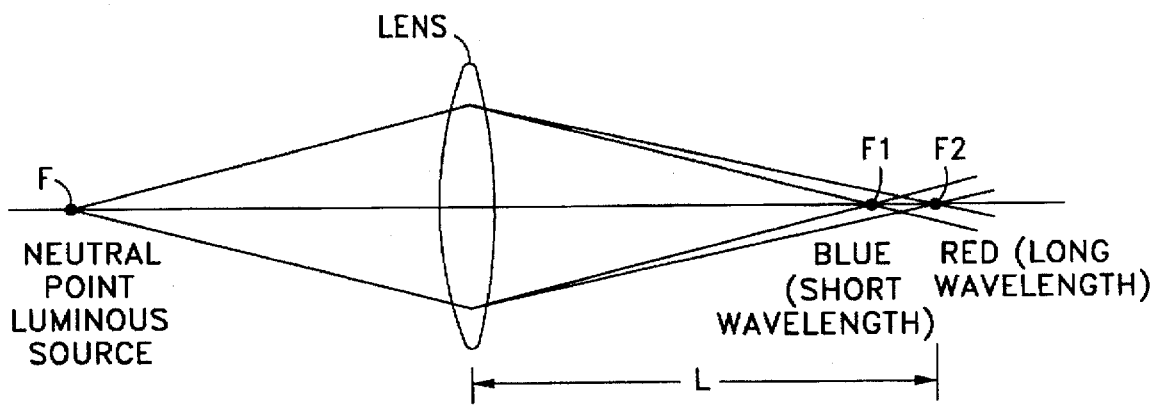
FIG. 4(a) and (b) are schematic diagrams showing the chromatic aberration.
Figure 4B:
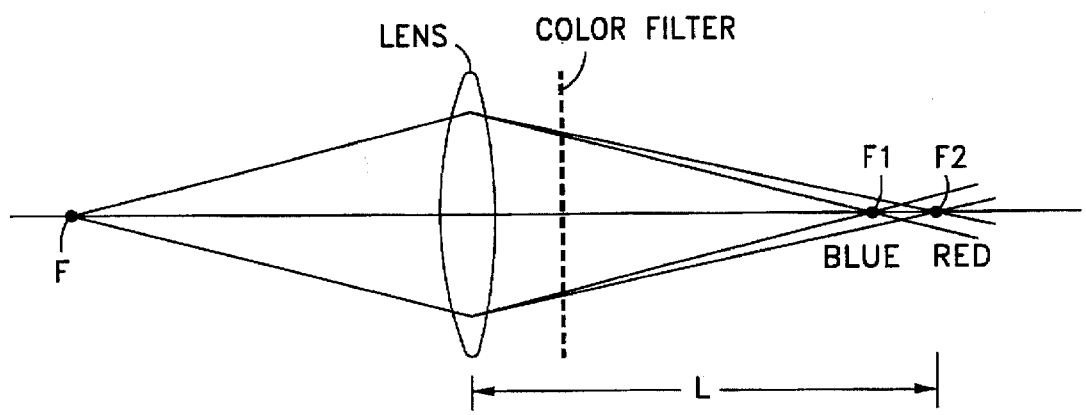

FIG. 2 shows the situation in which the focal point lengths are changed by refractions of the optical rays by means of the parallel plate 21. Namely, an image formed on the focal point F3 without the parallel plate 21 is moved to the focal point F4 by inserting the parallel plate 21 between the camera 19 and the optical lens 13. The distance of the focal movement varies depending on the thickness of the parallel plate 21.

By utilizing the characteristic of the parallel plate 21, the differences in the focal point lengths due to the chromatic aberration can be automatically adjusted by the difference of thickness of the parallel plates for each optical filter so that each focal point length becomes equal to other focal point lengths.

The present invention as described in the foregoing provides the following effects.

In the present invention, the parallel plates having different thicknesses are inserted in the pockets of the rotation plate along with the optical filters for adjusting the different focal point lengths due to the chromatic aberration of each optical filter. Thus, the size of the camera system is kept compact.

Moreover, the present invention is cost effective because multiple parallel plates are the only parts added to the conventional invention. Therefore, an increase of the manufacturing costs is limited within a reasonable range. Still, the present invention can realize the above-described objective of adjusting the differences in focal point lengths caused by the chromatic aberration.

What is claimed is:

1. An LCD test system, comprising:
   a camera section (19) having a built-in image element for capturing image contrast data of a display panel (10) to be inspected;

a rotation plate (14) having a plurality of types of optical filters for passing images on said display panel (10) therethrough;

an optical lens (13) for forming an image on said camera section (19);

a motor (15) for rotating said plate (14); and a plurality of parallel plates (21) provided corresponding to said plurality of optical filters for compensating differences in focal point lengths caused by a chromatic aberration of said optical lens, said parallel plates (21) having different thickness from the others depending on colors of said optical filters.

2. An LCD test system of claim 1, wherein said parallel plates (21) are provided between said optical lens (13) and said camera section (19).

3. An LCD test system of claim 1, wherein each of said plurality of parallel plates (21) is inserted in a pocket of said rotation plate (14) in which a corresponding one of said optical filters is seated.

4. An LCD test system of claim 1, wherein each of said plurality of parallel plates (21) is inserted in a pocket of said rotation plate (14) in parallel with corresponding one of said optical filters.

5. An LCD test system of claim 1, wherein each of said optical filters has a different color selected from the group consisting of among red (R), green (G), blue (B) and transparent.

* * * * *